(12) United States Patent
Cheng et al.

(10) Patent No.: US 12,282,223 B1
(45) Date of Patent: Apr. 22, 2025

(54) DISPLAY DEVICES

(71) Applicant: WUHAN CHINA STAR OPTOELECTRONICS TECHNOLOGY CO., LTD., Wuhan (CN)

(72) Inventors: Wei Cheng, Wuhan (CN); Wenlong Ye, Wuhan (CN); Zhicong Lin, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 18/700,202

(22) PCT Filed: Mar. 18, 2024

(86) PCT No.: PCT/CN2024/082260
§ 371 (c)(1),
(2) Date: Apr. 10, 2024

(30) Foreign Application Priority Data

Mar. 12, 2024 (CN) .......................... 202410284866.3

(51) Int. Cl.
*G02F 1/1335* (2006.01)
(52) U.S. Cl.
CPC .............................. *G02F 1/133601* (2021.01)
(58) Field of Classification Search
CPC ................................................ G02F 1/133601
See application file for complete search history.

(56) References Cited

U.S. PATENT DOCUMENTS

| | | | |
|---|---|---|---|
| 10,895,777 | B1 | 1/2021 | Lin et al. |
| 2023/0296932 | A1 | 9/2023 | Murata et al. |

FOREIGN PATENT DOCUMENTS

| | | | |
|---|---|---|---|
| CN | 105372883 | A | 3/2016 |
| CN | 106842737 | A | 6/2017 |
| CN | 110618547 | A | 12/2019 |
| CN | 113311600 | A | 8/2021 |
| CN | 217060711 | U | 7/2022 |
| CN | 115616807 | A | 1/2023 |
| CN | 115685638 | A | 2/2023 |

(Continued)

OTHER PUBLICATIONS

English Machine Translaion of CN 117 471721, Wang et al (Year: 2024).*

(Continued)

*Primary Examiner* — Donald L Raleigh
(74) *Attorney, Agent, or Firm* — The Roy Gross Law Firm, LLC; Roy D. Gross (57) ABSTRACT

Embodiments of the present disclosure provide a display device. The display device includes a backlight module, a first dimming box, a second dimming box, and a liquid crystal display module. The first dimming box is disposed on a light-emitting side of the backlight module. The second dimming box is disposed on a light-emitting side of the first dimming box. The liquid crystal display module is disposed on a light-emitting side of the second dimming box. A color coordinate offset between a color coordinate corresponding to a side viewing angle of 45° under the anti-peep mode and a color coordinate corresponding to a front viewing angle under the anti-peep mode is less than 0.1869.

20 Claims, 6 Drawing Sheets

(56) References Cited

FOREIGN PATENT DOCUMENTS

| | | | |
|---|---|---|---|
| CN | 116931312 A | | 10/2023 |
| CN | 219891508 U | | 10/2023 |
| CN | 117471721 A | * | 1/2024 |
| DE | 202023100641 U1 | | 5/2023 |
| TW | 202343111 A | | 11/2023 |

OTHER PUBLICATIONS

Chinese Office Action issued in corresponding Chinese Patent Application No. 202410284866.3 dated Jan. 21, 2025, pp. 1-10, 21pp.
PCT International Search Report for International Application No. PCT/CN2024/082260, mailed on Dec. 11, 2024, 12pp.
PCT Written Opinion of the International Searching Authority for International Application No. PCT/CN2024/082260, mailed on Dec. 11, 2024, 8pp.

* cited by examiner

DISPLAY DEVICES

CROSS-REFERENCE TO RELATED APPLICATIONS

This application is a national stage of International Application No. PCT/CN2024/082260, filed on Mar. 18, 2024, which claims priority to Chinese Patent Application No. 202410284866.3, filed on Mar. 12, 2024. The aforementioned applications are herein incorporated by references in their entireties.

TECHNICAL FIELD

The present disclosure relates to the field of display technologies, and in particular, to display devices.

BACKGROUND

Currently, the main technologies for display devices with switchable anti-peep display function are to add a dimming device between a display panel and a backlight module. One of the main technologies, i.e. the liquid crystal dimming technology, is to control an angle between an axis of the liquid crystal and the light passing through the liquid crystal, thereby changing a polarization state of the light passing through the liquid crystal, and then to control the transmittance of the incident light at different angles of the backlight module relying on a polarizer on the dimming device, so that the emitted light of the display device has a narrow viewing angle.

In order to improve the anti-peep display effect, multiple dimming boxes are generally stacked with the same box thickness and the same driving voltage. However, an additional second dimming box, in addition to be subject to a fact that the proportion of light receiving is not multiplied in comparing with a first dimming box, is subject to the effect of liquid crystal dispersion, which may increase chromatic aberration between an image at a side viewing angle and an image at a front viewing angle under the anti-peep mode. For example, the dimming boxes in existing technology generally are designed by referring to a dimming ability of liquid crystals on the light with a wavelength of 589 nanometers. This results in the designed dimming box having the best dimming effect on the incident light with the wavelength of 589 nanometers. When multiple identical dimming boxes are stacked to improve the anti-peep effect of the display device, it will cause a serious imbalance in proportions of light intensity of red light, green light, and blue light emitted at the side viewing angle of the display device under the anti-peep mode. That is, no matter what image is displayed at the front viewing angle, an overall image at the side viewing angle may be biased to blue or red.

SUMMARY

Embodiments of the present disclosure provide a display device that may reduce a risk of chromatic aberration between images at a side viewing angle and a front viewing angle under an anti-peep mode.

Embodiments of the present disclosure provide a display device with an anti-peep mode in a narrow viewing angle and a sharing mode in a wide viewing angle, and the display device includes:

a backlight module;
a first dimming box, disposed on a light-emitting side of the backlight module;
a second dimming box, disposed on a light-emitting side of the first dimming box; and
a liquid crystal display module, disposed on a light-emitting side of the second dimming box.

A color coordinate offset between a color coordinate corresponding to a side viewing angle of 45° under the anti-peep mode and a color coordinate corresponding to a front viewing angle under the anti-peep mode is less than 0.1869.

EMBODIMENTS OF THE INVENTION

The technical solutions in embodiments of the present disclosure will be clearly and completely described below with reference to the accompanying drawings in the embodiments of the present disclosure. Obviously, the described embodiments are only some of the embodiments of the present disclosure, rather than all of the embodiments. Based on the embodiments in the present disclosure, all other embodiments obtained by those skilled in the art without making creative efforts fall within the protection scope of the present disclosure. In addition, it should be understood that specific embodiments described here are only used to illustrate and explain the invention, and are not intended to limit the invention. In the present disclosure, unless otherwise specified, orientational terms such as "upper" and "lower" usually refer to the upper and lower positions of the device in actual use or working conditions, specifically orientations in the drawings. The terms "inside" and "outside" refer to the outline of the device. The terms "first", "second", "third", etc. are used merely as designators and do not impose numerical requirements or establish a sequence.

Embodiments of the present disclosure provide a display device, which will be described in detail below. It should be noted that the order of description of the following embodiments does not limit the preferred order of the embodiments.

Embodiments of the present disclosure provide the display device having an anti-peep mode in a narrow viewing angle and a sharing mode in a wide viewing angle, and the display device includes:
- a backlight module;
- a first dimming box, disposed on a light-emitting side of the backlight module;
- a second dimming box, disposed on a light-emitting side of the first dimming box; and
- a liquid crystal display module, disposed on a light-emitting side of the second dimming box.

A color coordinate offset between a color coordinate corresponding to a side viewing angle of 45° under the anti-peep mode and a color coordinate corresponding to a front viewing angle under the anti-peep mode is less than 0.1869.

Optionally, in some embodiments of the present disclosure, the first dimming box comprises a first substrate, a first liquid crystal layer, and a second substrate which are stacked in sequence, and the first substrate is disposed on one side close to the backlight module; the second dimming box comprises a third substrate, a second liquid crystal layer, and a fourth substrate which are stacked in sequence, and the third substrate is disposed on one side close to the first dimming box.

the first substrate is disposed on one side close to the backlight module, a thickness of the first liquid crystal layer is equal to a thickness of the second liquid crystal layer, a refractive index difference Δn of the first liquid crystal layer is the same with a refractive index difference Δn of the second liquid crystal layer, and a first driving voltage supplied to the first dimming box is different from a second driving voltage supplied to the second dimming box.

Optionally, in some embodiments of the present disclosure, the first driving voltage and the second driving voltage are alternating voltages, the thickness of the first liquid crystal layer and the thickness of the second liquid crystal layer are between 4 microns and 8 microns, an amplitude of the first driving voltage is between 3.5V and 5.5V, an amplitude of the second driving voltage is between 4V and 7V, and a frequency of the first driving voltage and a frequency of the second driving voltage are between 40 Hz and 120 Hz.

Optionally, in some embodiments of the present disclosure, the first dimming box comprises a first substrate, a first liquid crystal layer, and a second substrate which are stacked in sequence, and the first substrate is disposed on one side close to the backlight module; the second dimming box comprises a third substrate, a second liquid crystal layer, and a fourth substrate which are stacked in sequence, and the third substrate is disposed on one side close to the first dimming box.

A thickness of the first liquid crystal layer is different from a thickness of the second liquid crystal layer, and a refractive index difference Δn of the first liquid crystal layer is different from a refractive index difference Δn of the second liquid crystal layer.

Optionally, in some embodiments of the present disclosure, the thickness of the first liquid crystal layer is greater than the thickness of the second liquid crystal layer, and the refractive index difference Δn of the first liquid crystal layer is less than the refractive index difference Δn of the second liquid crystal layer.

Alternatively, the thickness of the first liquid crystal layer is less than the thickness of the second liquid crystal layer, and the refractive index difference Δn of the first liquid crystal layer is greater than the refractive index difference Δn of the second liquid crystal layer.

Optionally, in some embodiments of the present disclosure, each of the thickness of the first liquid crystal layer and the thickness of the second liquid crystal layer is between 2 microns and 10 microns, and each of the refractive index difference Δn of the first liquid crystal layer and the refractive index difference Δn of the second liquid crystal layer is between 0.1 and 0.26.

Optionally, in some embodiments of the present disclosure, an amplitude of the first driving voltage is an optimal driving voltage amplitude, and an amplitude of the second driving voltage is a non-optimal driving voltage amplitude.

Optionally, in some embodiments of the present disclosure, an amplitude of the first driving voltage is a non-optimal driving voltage amplitude, and an amplitude of the second driving voltage is a non-optimal driving voltage amplitude.

Optionally, in some embodiments of the present disclosure, the display device further comprises a first polarizer, a second polarizer, and an anti-peeping film; the liquid crystal display module comprises a liquid crystal panel, a third polarizer, and a fourth polarizer, the fourth polarizer is disposed on one side of the liquid crystal panel facing away from the backlight module, and the third polarizer is disposed on one side of the liquid crystal panel close to the backlight module; the second polarizer is disposed between the first dimming box and the second dimming box, and the first polarizer is disposed on one side of the first dimming box close to the backlight module.

The anti-peeping film is disposed between any two of the backlight module, the first polarizer, the first dimming box, the second polarizer, the second dimming box, the third polarizer, the liquid crystal panel, and the fourth polarizer.

The anti-peeping film is arranged to have a reflectivity positively correlated with an incident angle of light.

Optionally, in some embodiments of the present disclosure, the anti-peeping film comprises light-transmitting films stacked in multiple layers, and any two adjacent layers of the light-transmitting films have different refractive indexes.

Optionally, in some embodiments of the present disclosure, the display device further comprises a third dimming box disposed between the first dimming box and the liquid crystal display module, and the color coordinate offset between the color coordinate corresponding to the side viewing angle of 45° under the anti-peep mode and the color coordinate corresponding to the front viewing angle under the anti-peep mode is less than 0.1869

Optionally, in some embodiments of the present disclosure, under the sharing mode, the first dimming box and the second dimming box are both not supplied with the driving voltage.

Embodiments of the present disclosure provide the display device having the anti-peep mode in a narrow viewing angle and the sharing mode in a wide viewing angle, and the display device includes the backlight module, the first dimming box, the second dimming box, and the liquid crystal display module. The first dimming box is arranged on the light-emitting side of the backlight module. The second dimming box is arranged on the light-emitting side of the first dimming box. The liquid crystal display module is arranged on the light-emitting side of the second dimming box. At the side viewing angle under the anti-peep mode, the second dimming box is configured to weak color light having the highest brightness emitted by the first dimming box. At the side viewing angle under the anti-peep mode, the embodiments of the present disclosure reduce difference in the proportions of red light, green light, and blue light by adjusting the first dimming box and the second dimming box, so that a color coordinate corresponding to the side viewing angle of 45° under the anti-peep mode of the display device is closer to a color coordinate corresponding to the front viewing angle (0°) under the anti-peep mode, thereby improving chromatic aberration between images at the side viewing angle and the front viewing angle under the anti-peep mode of the display device.

Figure 1:
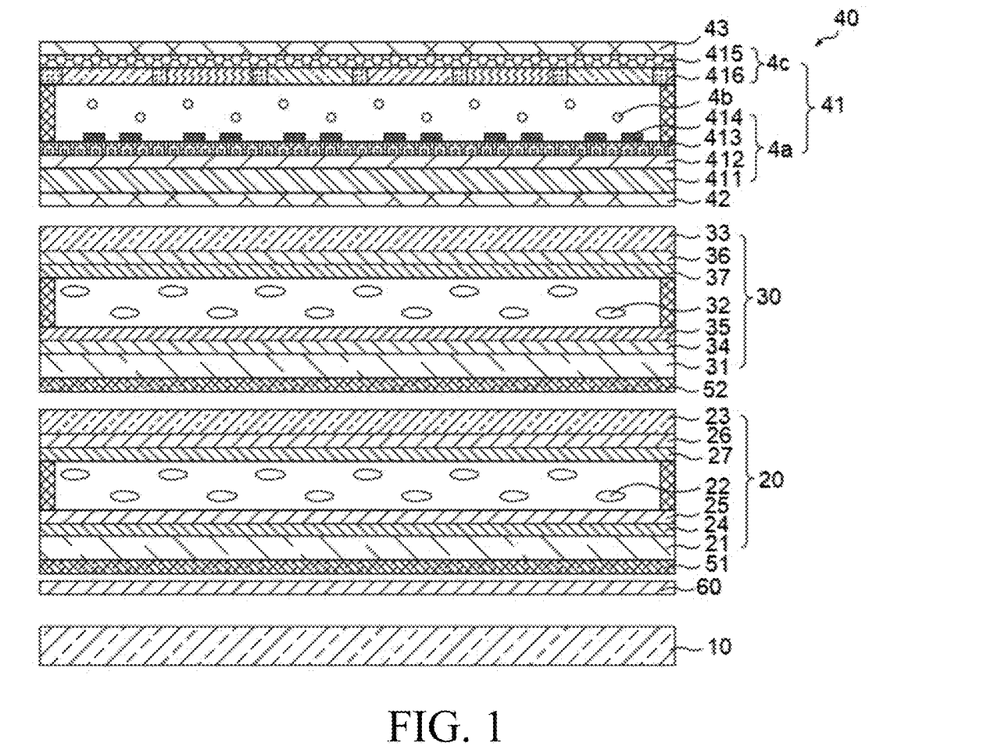
FIG. 1 is a schematic structural view of a display device provided by an embodiment of the present disclosure.

Referring to FIG. 1, an embodiment of the present disclosure provides a display device 100 having an anti-peep mode in a narrow viewing angle and a sharing mode in a wide viewing angle. The display device 100 includes a backlight module 10, a first dimming box 20, a second dimming box 30, and a liquid crystal display module 40.

The first dimming box 20 is disposed on a light-emitting side of the backlight module 10. The second dimming box 30 is disposed on a light-emitting side of the first dimming box 20. The liquid crystal display module 40 is disposed on a light-emitting side of the second dimming box 30.

A color coordinate offset between the color coordinate corresponding to a side viewing angle of 45° under the anti-peep mode and a color coordinate corresponding to a front viewing angle under the anti-peep mode is less than 0.1869.

The embodiments of the present disclosure provide the display device 100. At the side viewing angle under the anti-peep mode, the embodiments of the present disclosure reduce the difference in the proportions of red light, green light, and blue light by adjusting the first dimming box 20 and the second dimming box 30, so that the color coordinate corresponding to the side viewing angle of 45° under the anti-peep mode of the display device 100 is closer to the color coordinate corresponding to the front viewing angle (0°) under the anti-peep mode, thereby improving the chromatic aberration between images at the side viewing angle and the front viewing angle under the anti-peep mode of the display device 100.

It should be noted that the color coordinate offset is a distance from the color coordinate corresponding to the front viewing angle (0°) under the anti-peep mode of the display device 100 to the color coordinate corresponding to the side viewing angle of 45° under the anti-peep mode. For example, under the anti-peep mode, the color coordinate corresponding to the viewing angle of 0° is a color coordinate of a white light dot, and the color coordinate of the white light dot is (0.333, 0.333). The color coordinate offset is a distance from a color coordinate of any color dot to the color coordinate of the white light dot. The smaller the color coordinate offset is, the closer the color coordinate of the color dot is to that of the white light dot. Therefore, the closer the color coordinate of the color dot corresponding to the side viewing angle of 45° under the anti-peep mode is to the color coordinate of the white light dot, the smaller the chromatic aberration between images at the side viewing angle and the front viewing angle, and the better the improvement effect.

Figure 7:
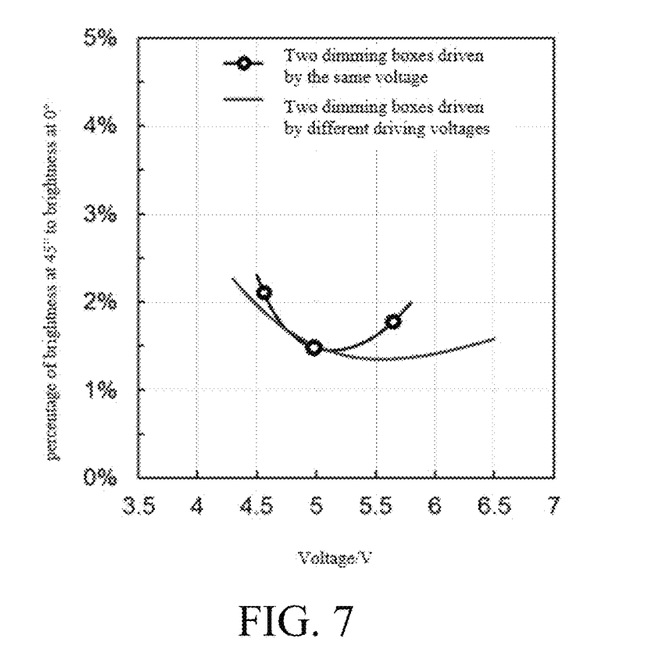
FIG. 7 is a diagram showing light collection effect under the anti-peep mode (NVA) of an embodiment of the present disclosure and the comparation example.
Figure 8:
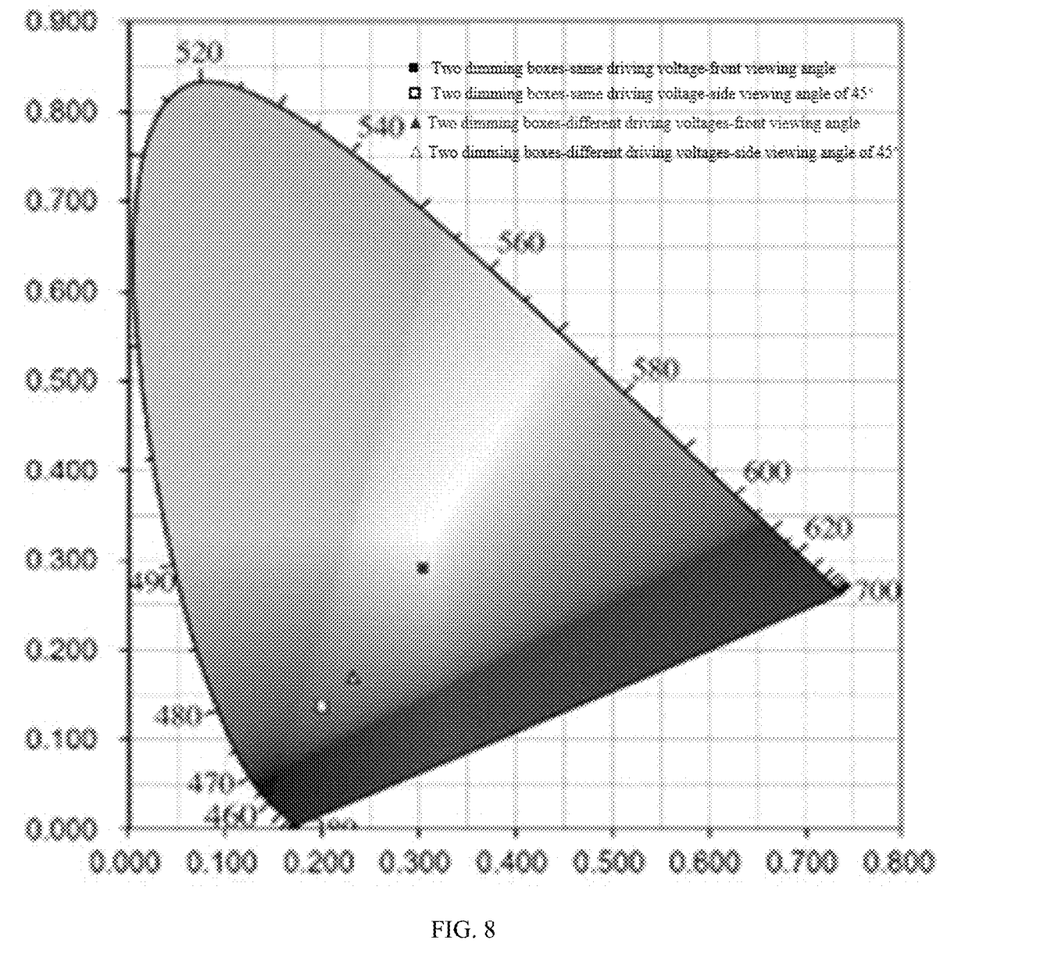
FIG. 8 is a coordinate graph of color dots corresponding to the front viewing angle and the side viewing angle of 45° under the anti-peep mode (NVA) of an embodiment of the present disclosure and the comparation example.

In the related art, referring to FIG. 7 and FIG. 8, when a driving voltage of the two dimming boxes (the first dimming box and the second dimming box) is 5.1V, a percentage of the brightness at 45° to the brightness at 0° is 1.44%, and the display device has the best light collection effect. However, at this time, the color dot (0.305, 0.291) corresponding to the front viewing angle (0°) under the anti-peep mode has a color coordinate of the color dot (0.199, 0.137) corresponding to the side viewing angle of 45° under the anti-peep mode, and the color coordinate offset is approximately 0.18695.

A main wavelength band of visible light is between 380 nanometers and 780 nanometers. At the side viewing angle, the transmittance of visible light in different bands through one dimming box is different, and the transmittance of visible light in different bands may be affected by adjusting the driving voltage of the dimming box. Therefore, when the visible light incident as white light passes through two identical dimming boxes having the same driving voltage, the visible light bands adjusted by the two dimming boxes are the same, the proportions of light intensity of visible light in different bands are seriously unbalanced, and there is a serious offset in the color dot of the transmitted light.

Embodiments of the present disclosure improve the chromatic aberration by adjusting at least one of the driving voltages, thicknesses of the liquid crystal layers, and liquid crystal types of the first dimming box 20 and the second dimming box 30. For example, when the first dimming box 20 and the second dimming box 30 are the same dimming box, that is, when the thicknesses of the liquid crystal layers and the liquid crystal types are the same, the driving voltages of the first dimming box 20 and the second dimming box 30 may be adjusted to be different, so that the visible light bands adjusted by the two dimming boxes are different. Therefore, compared with the display device having the same dimming boxes and the same driving voltages, the change in the proportions of light intensity of different bands of visible light adjusted by the two dimming boxes of the display device 100 of the present disclosure is small, making the coordinate of the color dot closer to the color coordinate of the white light dot, thereby improving the chromatic aberration between images at the side viewing angle and the front viewing angle under the anti-peep mode.

For another example, compared with the proportions of light intensity of red light, green light, and blue light in the white light, in the light emitted by the first dimming box 20, on a condition that the proportion of light intensity of the blue light has the largest offset, followed by the proportion of light intensity of the red light, and the proportion of light intensity of the green light has the smallest offset, the second dimming box 30 is configured to reduce the proportion of light intensity of the blue light; and on a condition that the proportion of light intensity of the red light has the largest offset, followed by the proportion of light intensity of the blue light, and the proportion of light intensity of the green light has the smallest, the second dimming box 30 is configured to reduce the proportion of light intensity of the red light.

It should be noted that the white light is formed by mixing the red light, the green light, and the blue light according to certain proportions of light intensity. Therefore, a standard of a proportion offset of the light intensity is a ratio of the proportions of light intensity of the red light, the green light, and the blue light in the white light. Optionally, the ratio of the proportions of light intensity of the red light, the green light, and the blue light in the white light may be 3:6:1. A mixing ratio of the red light, the green light, and the blue light in the white light may also be appropriately adjusted according to material conditions of sub-pixels of the display panel itself.

In an embodiment, the display device 100 further includes a first polarizer 51 and a second polarizer 52. The liquid crystal display module 40 includes a liquid crystal panel 41, a third polarizer 42, and a fourth polarizer 43. The fourth polarizer 43 is disposed on one side of the liquid crystal panel 41 facing away from the backlight module 10. The third polarizer 42 is disposed on one side of the liquid crystal panel 41 close to the backlight module 10. The second polarizer 52 is disposed between the first dimming box 20 and the second dimming box 30. The first polarizer 51 is disposed on one side of the first dimming box 20 close to the backlight module 10.

The first dimming box 20 includes a first substrate 21, a first liquid crystal layer 22, and a second substrate 23 which are stacked in sequence. The first substrate 21 is disposed on one side close to the backlight module 10. The second dimming box 30 includes a third substrate 31, a second liquid crystal layer 32, and a fourth substrate 33 which are stacked in sequence. The third substrate 31 is disposed on one side close to the first dimming box 20.

It can be understood that when the light is parallel to a polarization axis of the polarizer, the light can pass through the polarizer; and when the light is perpendicular to the polarization axis of the polarizer, it will be blocked.

Therefore, when the polarization axes of the first polarizer 51 and the second polarizer 52 are parallel and the first dimming box 20 is not provided with the driving voltage, the light can naturally pass through the second polarizer 52. When the polarization axes of the first polarizer 51 and the second polarizer 52 are perpendicular, the first dimming box 20 needs to be supplied with the driving voltage to deflect liquid crystals of the first dimming box 20, so that the light can pass through the second polarizer 52.

That is to say, based on the design of the polarization axes of the first polarizer 51, the second polarizer 52, and the third polarizer 42, driving modes of the first dimming box 20 and the second dimming box 30 may be appropriately adjusted.

The present disclosure takes as an example that the polarization axes of the first polarizer 51, the second polarizer 52, and the third polarizer 42 are parallel to each other, but is not limited thereto.

Therefore, under the sharing mode, neither the first dimming box 20 nor the second dimming box 30 is supplied with the driving voltage. In some embodiments, the first dimming box 20 and the second dimming box 30 may also be supplied with an extremely weak voltage, such as 0.02V.

Optionally, the liquid crystal panel 41 may be a panel with a TN, VA, IPS, or FFS display architecture. The embodiments of the present disclosure are explained by taking the liquid crystal panel 41 as an IPS panel as an example, but is not limited thereto.

The liquid crystal panel 41 includes an array substrate 4a, liquid crystals 4b, and a color filter substrate 4c. The array substrate 4a includes a first substrate 411, a common electrode layer 412, an insulating layer 413, and a pixel electrode 414 which are stacked in sequence. The color filter substrate 4c includes a second substrate 415 and a color filter layer 416 provided on one side of the second substrate 415 close to the liquid crystals 4b.

Optionally, the first dimming box 20 and the second dimming box 30 may be driven by a vertical electric field to deflect the liquid crystals, or may be driven by a horizontal electric field or a transverse electric field to deflect the liquid crystals. When the two dimming boxes are driven by the horizontal electric field or the transverse electric field, the common electrode and a driving electrode are both arranged on the same substrate.

Compared with the horizontal electric field or the transverse electric field, the vertical electric field driving has a better anti-peeping effect and may reduce the risk of light leakage at a large viewing angle.

Therefore, optionally, the first dimming box 20 and the second dimming box 30 adopt an ECB or VA mode architecture. The first dimming box 20 further includes a first driving electrode 24, a first alignment film 25, a second driving electrode 26, and a second alignment film 27. The first driving electrode 24 is disposed on one side of the first substrate 21 close to the first liquid crystal layer 22. The first alignment film 25 is disposed on one side of the first driving electrode 24 close to the first liquid crystal layer 22. The second driving electrode 26 is disposed on one side of the second substrate 23 close to the first liquid crystal layer 22. The second alignment film 27 is disposed on one side of the second driving electrode 26 close to the first liquid crystal layer 22.

The second dimming box 30 further includes a third driving electrode 34, a third alignment film 35, a fourth driving electrode 36, and a fourth alignment film 37. The third driving electrode 34 is disposed on one side of the third substrate 31 close to the second liquid crystal layer 32. The third alignment film 35 is disposed on one side of the third driving electrode 34 close to the second liquid crystal layer 32. The fourth driving electrode 36 is disposed on one side of the fourth substrate 33 close to the second liquid crystal layer 32. The fourth alignment film 37 is disposed on one side of the fourth driving electrode 36 close to the second liquid crystal layer 32.

Optionally, when the first dimming box 20 and the second dimming box 30 adopt the ECB mode architecture, a pretilt angle of the liquid crystals of the first liquid crystal layer 22 and a pretilt angle of the liquid crystals of the second liquid crystal layer 32 are between 0° and 10°, such as 0°, 1°, 2°, 3°, 4°, 5°, 6°, 7°, 8°, 9° or 10°, etc. When the first dimming box 20 and the second dimming box 30 adopt the VA mode architecture, the pretilt angle of the liquid crystals of the first liquid crystal layer 22 and the pretilt angle of the liquid crystals of the second liquid crystal layer 32 are between 87° and 90°, such as 87°, 88°, 89°, or 90°, etc. The liquid crystal is arranged to have the pretilt angle, which facilitates the liquid crystal to quickly respond to deflection and improves the response speed.

Figure 2:
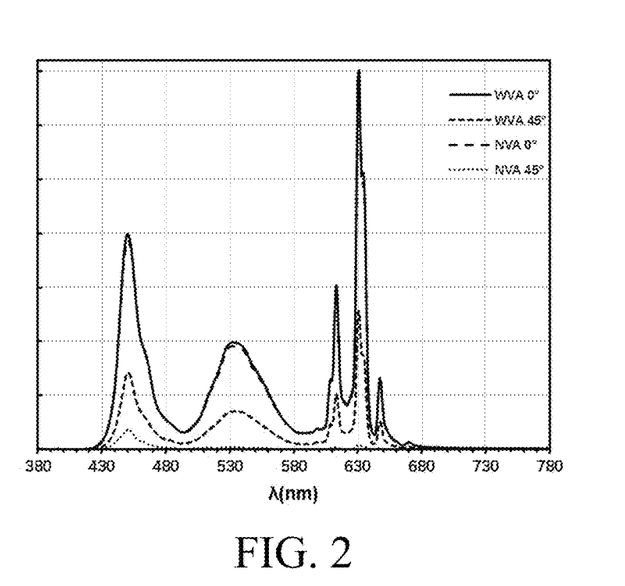
FIG. 2 is a spectrum map corresponding to a front viewing angle and a viewing angle of 45° under a sharing mode (i.e. at a wide viewing angle, WVA) and an anti-peep mode (i.e. at a narrow viewing angle, NVA) of a comparation example.
Figure 3:
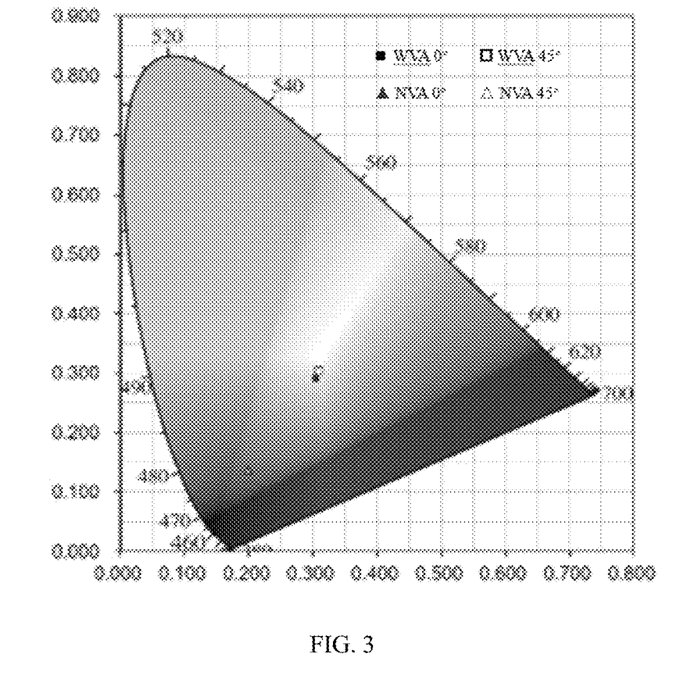
FIG. 3 is a coordinate graph of color dots corresponding to the front viewing angle and the side viewing angle of 45° under the sharing mode (WVA) and the anti-peep mode (NVA) of the comparation example.

It should be noted that in the anti-peep display device of the comparation example, the first dimming box and the second dimming box adopt the same design, that is, the same liquid crystals, the same box thickness (thickness of the liquid crystal layer), and the same driving voltage, which results in that the spectrum and color dots corresponding to the front viewing angle and the side viewing angle of 45° under the anti-peep mode (narrow viewing angle) and the sharing mode (wide viewing angle) in practical applications are as shown in FIG. 2 and FIG. 3. Under the sharing mode (WVA), emitted light at the front viewing angle and the side viewing angle is not modulated by the two dimming boxes. The proportions of light intensity of red light, green light, and blue light in the emitted light at the side viewing angle is basically consistent with those in the white light, so the chromatic aberration between images of the two is small. However, under the anti-peep mode (NVA), after the emitted light at the side viewing angle is modulated by the two dimming boxes, due to wavelength dispersion characteristics of the liquid crystals, the proportions of light intensity of red light, green light, and blue light in the emitted light at the side viewing angle is seriously unbalanced, and the color dot is seriously shifted from the white light dot. It should be noted that in FIG. 3, the color dot corresponding to the front viewing angle (0°) under the sharing mode (WVA) partially overlaps with the color dot corresponding to the front viewing angle (0°) under the anti-peep mode (NVA).

In an embodiment of the present disclosure, the first substrate 21 is disposed on one side close to the backlight module 10. A thickness of the first liquid crystal layer 22 is equal to a thickness of the second liquid crystal layer 32. A refractive index difference Δn of the first liquid crystal layer 22 is the same as a refractive index difference Δn of the second liquid crystal layer 32. The first driving voltage V1 supplied to the first dimming box 20 is different from the second driving voltage V2 supplied to the second dimming box 30.

That is to say, in the embodiment of the present disclosure, the first dimming box 20 and the second dimming box 30 are driven with different driving voltages respectively, so as to reduce the proportion difference of light intensity in red light band, green light band, and blue light band between the emitted light at the side viewing angle and the emitted light at the front viewing angle arriving at the liquid crystal display module 40. Thus, while maintaining the anti-peep effect of the display device 100 under the anti-peep mode, the chromatic aberration between images at the side viewing angle and the front viewing angle is reduced.

It should be explained that the refractive index difference Δn of the liquid crystals refers to a refractive index difference (Δn=ne−no) of the liquid crystals for the light with wavelength of 589 nanometers. The first driving voltage V1 refers to a voltage difference between the first driving electrode 24 and the second driving electrode 26, and the second driving voltage V2 refers to a voltage difference between the third driving electrode 34 and the fourth driving electrode 36.

In an embodiment, the thickness of the first liquid crystal layer 22 and the thickness of the second liquid crystal layer 32 are between 4 microns and 8 microns. The refractive index difference Δn of the first liquid crystal layer 22 and the refractive index difference Δn of the second liquid crystal layer 32 are between 0.1 and 0.26.

Figure 4:
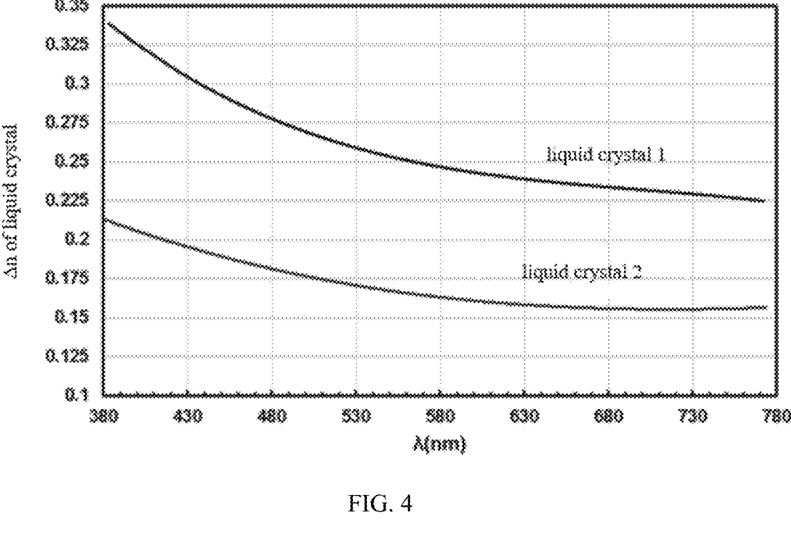
FIG. 4 is a diagram showing a relationship between light wavelengths corresponding to refractive index differences Δn of two different liquid crystals.

It can be understood that, as shown in FIG. 4, based on wavelength dispersion characteristics of the liquid crystals, the Δn of the liquid crystals for the visible light decreases as the wavelength of the visible light increases. The thickness of the liquid crystal layer has a certain impact on the spectrum band of light, and the larger the thickness, the larger the impact. In addition, the larger the refractive index difference Δn of the liquid crystals, the smaller the thickness (thickness of the liquid crystal layer) required for the dimming box; the smaller the refractive index difference Δn of the liquid crystals, the larger the thickness required for the dimming box. That is, the thicknesses of the first liquid crystal layer 22 and the thicknesses of the second liquid crystal layer 32 are negatively correlated with their respective liquid crystal refractive index differences Δn.

Optionally, the thickness of the first liquid crystal layer 22 and the thickness of the second liquid crystal layer 32 may be 4 microns, 5 microns, 6 microns, 7 microns, or 8 microns, etc.

Optionally, the refractive index difference Δn of the first liquid crystal layer 22 and the refractive index difference Δn of the second liquid crystal layer 32 may be 0.1, 0.11, 0.12, 0.13, 0.14, 0.15, 0.16, 0.17, 0.18, 0.19, 0.2, 0.21, 0.22, 0.23, 0.24, 0.25 or 0.26, etc.

The first driving voltage V1 and the second driving voltage V2 are alternating (AC) voltages. An amplitude of the first driving voltage V1 is between 3.5V and 5.5V. An amplitude of the second driving voltage V2 is between 4V and 7V. Frequencies of the first driving voltage V1 and the second driving voltage V2 are between 40 Hz and 120 Hz.

In the present disclosure, the alternating voltages are used to drive the first dimming box 20 and the second dimming box 30, which may reduce the risk of polarization of the liquid crystals in the first liquid crystal layer 22 and the second liquid crystal layer 32.

What needs to be understood is that the higher the frequency, the higher a switching frequency of the driving voltage, and the lower the risk of polarization of the liquid crystals, but the greater the power consumption. The larger the driving voltage, the larger the intensity of the electric field formed, the faster the liquid crystals deflect, and a deflection angle may also become larger.

Based on selections of the thickness of the first liquid crystal layer 22, the thickness of the second liquid crystal layer 32, the first driving voltage V1, the second driving voltage V2, and the frequencies, the proportions of light intensity of red light, green light, and blue light in the emitted light at the side viewing angle is adjusted, so as to reduce the chromatic aberration between images at the side viewing angle and the front viewing angle.

Optionally, the first driving voltage V1 may be 3.5V, 3.6V, 3.7V, 3.8V, 3.9V, 4V, 4.1V, 4.2V, 4.3V, 4.4V, 4.5V, 4.6V, 4.7V, 4.8V, 4.9V, 5V, 5.1V, 5.2V, 5.3V, 5.4V, or 5.5V, etc.

The second driving voltage V2 may be 4V, 4.1V, 4.2V, 4.3V, 4.4V, 4.5V, 4.6V, 4.7V, 4.8V, 4.9V, 5V, 5.1V, 5.2V, 5.3V, 5.4V, 5.5V, 5.6V, 5.7V, 5.8V, 5.9V, 6V, 6.1V, 6.2V, 6.3V, 6.4V, 6.5V, 6.6V, 6.7V, 6.8V, 6.9V, or 7V, etc.

The frequency of the first driving voltage V1 and the frequency of the second driving voltage V2 may each be 40 Hz, 50 Hz, 60 Hz, 70 Hz, 80 Hz, 90 Hz, 100 Hz, 110 Hz, or 120 Hz, etc.

In addition, optionally, waveforms of the first driving voltage V1 and the second driving voltage V2 may be square waves, sine waves, triangular waves, etc. The first driving voltage V1 and the second driving voltage V2 have the same wave width. The first driving voltage V1 and the second driving voltage V2 may have a phase difference or may not have a phase difference.

Figure 5:
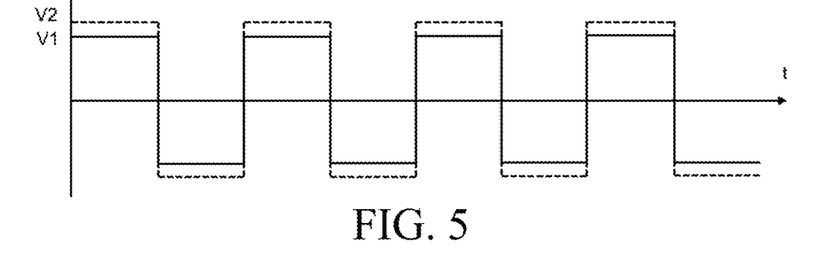
FIG. 5 is a timing diagram of a first driving voltage and a second driving voltage of a display device provided by an embodiment of the present disclosure.
Figure 6:
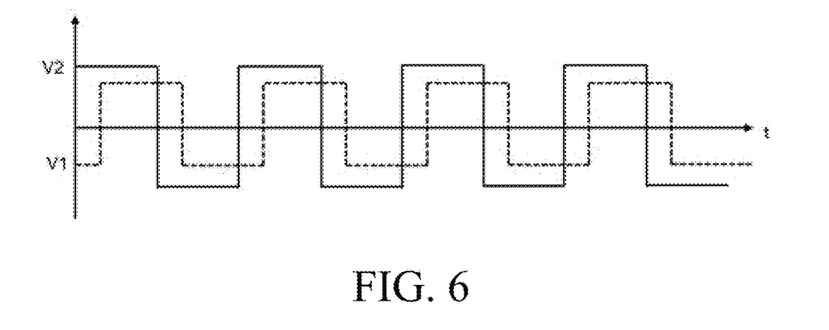
FIG. 6 is another timing diagram of a first driving voltage and a second driving voltage of a display device provided by an embodiment of the present disclosure.

Compared with the display device of the comparation example (in which, the driving voltage of the two dimming boxes is an AC voltage of 5.1V with a square wave), in the embodiments of the present disclosure, that the first driving voltage V1 is 5V with a square wave, and the second driving voltage V2 is 5.9V with a square wave is taken as an example. Referring to FIG. 5 and FIG. 6, that is, when the first driving electrode 24 is supplied with a voltage of 5V, the second driving electrode 26 is supplied with a voltage of 0V; when the first driving electrode 24 is supplied with a voltage of 0V, the second driving electrode 26 is supplied with a voltage of 5V; and it is driven alternately at the set frequency in this way. When the third driving electrode 34 is supplied with a voltage of 5.9V, the fourth driving electrode 36 is supplied with a voltage of 0V; when the third driving electrode 34 is supplied with a voltage of 0V, the fourth driving electrode 36 is supplied with a voltage of 5.9V; and it is driven alternately at the set frequency in this way.

Referring to FIG. 7 and FIG. 8, it should be understood that the smaller the percentage of the brightness at 45° to the brightness at 0°, the better the light collection effect of the display device. According to FIG. 7, in the display device of the comparation example, when the driving voltage of the two dimming boxes (the first dimming box and the second dimming box) is 5.1V, the percentage of the brightness at 45° to the brightness at 0° is 1.44%, and the display device has the best light collection effect. When the first driving voltage of the first dimming box 20 of the two dimming boxes is 5V and the second driving voltage is 5.9V, the percentage of the brightness at 45° to the brightness at 0° is also 1.44%, but the light collection effect of the display device 100 is not optimal. It should be understood that the optimal driving voltage corresponds to the best light collection effect, that is, the percentage of the brightness at 45° to the brightness at 0° is the smallest.

According to FIG. 8, it can be seen that the color dot (0.305, 0.291) corresponding to the front viewing angle (0° viewing angle) of the comparation example and the color dot (0.304, 0.291) corresponding to the front viewing angle (0° viewing angle) of the embodiment of the present disclosure almost overlap. In the embodiment of the present disclosure, by adjusting the brightness of the blue light, the color dot (0.232, 0.169) corresponding to the side viewing angle of 45° is closer to the color dot corresponding to the front viewing angle than the color dot (0.199, 0.137) of the comparation example. That is, under the anti-peep mode in the embodiment of the present disclosure, the proportions of light intensity of red light, green light, and blue light at the front viewing angle and the proportions of light intensity of red light, green light, and blue light at the side viewing angle are closer, which reduces the risk of serious chromatic aberration between the images at the front viewing angle and the side viewing angle.

In summary, the embodiments of the present disclosure may minimize the risk of serious chromatic aberration between the images at the front viewing angle and the side viewing angle under the anti-peep mode while ensuring that the light collection effect is not reduced.

In addition, according to experiments, while keeping the driving voltage (5V) of the first dimming box 20 unchanged, by gradually increasing the driving voltage of the second dimming box 30 in the range of 5V to 6.5V, the coordinate of the color dot corresponding to the side viewing angle of 45° under the anti-peep mode gradually approaches the coordinate of the color dot corresponding to the front viewing angle of 0° under the anti-peep mode.

In an embodiment, the amplitude of the first driving voltage is an optimal driving voltage amplitude, and the amplitude of the second driving voltage is a non-optimal driving voltage amplitude. Such an arrangement not only prevents the light-collecting effect of the display device from being reduced or reduced too much, affecting the anti-peep effect, but also improves the chromatic aberration between images at the front viewing angle and at the side viewing angle.

In another embodiment, the amplitude of the first driving voltage is a non-optimal driving voltage amplitude, and the amplitude of the second driving voltage is a non-optimal driving voltage amplitude. Such an arrangement may minimize the risk of chromatic aberration between images at the front viewing angle and at the side viewing angle.

In an embodiment, the display device 100 further includes an anti-peeping film 60, which is disposed between any two of the backlight module 10, the first polarizer 51, the first dimming box 20, the second polarizer 52, the second dimming box 30, the third polarizer 42, the liquid crystal panel 41, and the fourth polarizer 43.

The anti-peeping film 60 is arranged to have a reflectivity positively correlated with an incident angle of light.

When the anti-peeping film 60 is disposed between the third polarizer 42 and the second dimming box 30, the anti-peeping film 60 has the best effect in improving light leakage at the large angle. When the anti-peeping film 60 is disposed between the first polarizer 51 and the backlight module 10, the brightness of the display device 100 is maximum, and the effect of improving light leakage at the large angle is reduced.

Figure 9:
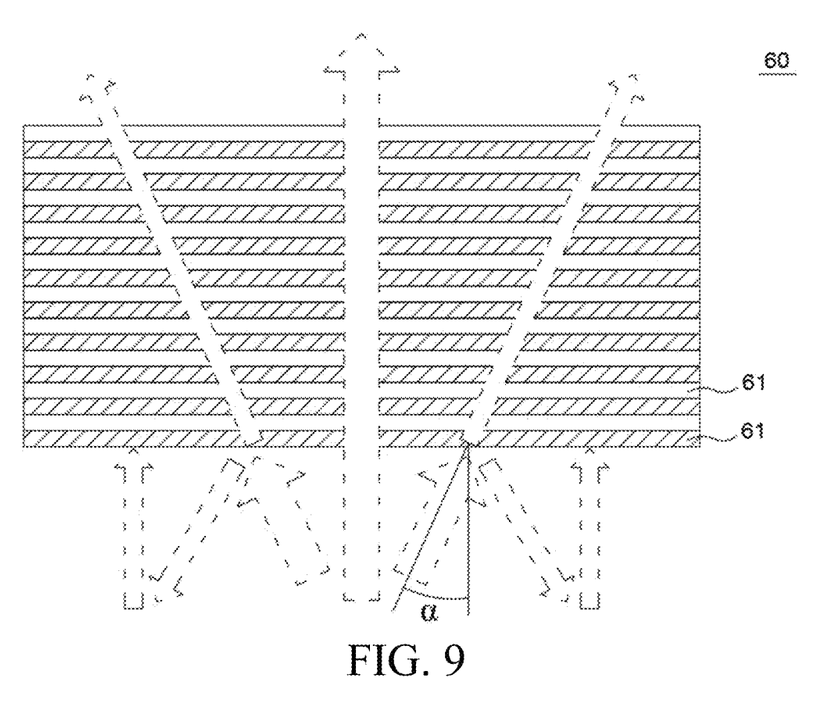
FIG. 9 is a schematic structural view of an anti-peeping film of a display device provided by an embodiment of the present disclosure.

Optionally, referring to FIG. 9, the anti-peeping film 60 includes light-transmitting films 61 stacked in multiple layers, and any two adjacent layers of the light-transmitting films 61 have different refractive indexes.

A thickness of the light-transmitting film 61 is about 100 nanometers, such as 100 nanometers. A total thickness of the anti-peeping film 60 is between 20 microns and 300 microns, for example, it may be 20 microns, 30 microns, 40 microns, 50 microns, 60 microns, 70 microns, 80 microns, 90 microns, 100 microns, 150 microns, 200 microns, 250 microns, or 300 microns, etc.

What needs to be understood is that the incident light will undergo interference reflection after entering the interface inside the films, so that the reflectivity is positively correlated with the incident angle. That is, the incident light at the front viewing angle has high transmittance and low reflectivity, and the incident light at a large angle ($\alpha > 50°$) has low transmittance and high reflectivity.

After the anti-peep function of the display device 100 is turned on, a principle of the difference between a percentage of the brightness at a small viewing angle ($25° \sim 50°$) of anti-peep angles to the brightness at the front viewing angle and a percentage of the brightness at a large viewing angle ($\alpha > 50°$) of the anti-peep angles to the brightness at the front viewing angle is as follows: First, the emitted light at the front viewing angle of the backlight module 10 passes through the front anti-peeping film 60 and reaches the first polarizer 51, and most of the emitted light at the side large viewing angle ($\alpha > 50°$) is reflected back to the backlight module 10, converted into the front-view light through reflection, and then emitted to the first polarizer 51. Under the sharing mode, the first and second dimming boxes 20 and 30 adopting the ECB mode architecture do not modulate the light at the front viewing angle and horizontal side viewing angle, and the light normally passes through the third polarizer 42, reaches the liquid crystal panel 41, and is controlled by a series of pixels of the liquid crystal panel 41, thereby mixing various colors. Under the anti-peep mode, the first and second dimming boxes 20 and 30 adopting the ECB mode architecture still have no modulating effect on the light at the front viewing angle, the light at the front viewing angle passes through the third polarizer 42, reaches the liquid crystal panel 41, and is controlled by the series of pixels of the liquid crystal panel 41, thereby mixing various colors. At the same time, by controlling a tilt state of the liquid crystals in the first and second dimming boxes 20 and 30, the light at the horizontal side viewing angle is modulated, so that the light cannot pass through the third polarizer 42 to reach the inside of the liquid crystal panel 41. When viewed from one side of the third polarizer 42 facing away from the liquid crystal panel 41, the liquid crystal panel 41 is in a black state, achieving the anti-peep display in the narrow viewing angle. By adjusting the tilt state of the liquid crystals in the liquid crystal cells, the anti-peep display device may be switched between wide and narrow viewing angle, thereby achieving switchable anti-peep display.

In another embodiment, instead of only adjusting the driving voltage of the first dimming box 20 and the driving voltage of the second dimming box 30, this embodiment may also adjust the thickness of the liquid crystal layer and the refractive index difference $\Delta n$.

Optionally, the thickness of the first liquid crystal layer 22 is different from the thickness of the second liquid crystal layer 32, the refractive index difference Δn of the first liquid crystal layer 22 and the refractive index difference Δn of the second liquid crystal layer 32 are different, and the first driving voltage supplied to the first dimming box 20 is different from the second driving voltage supplied to the second dimming box 30.

Since different liquid crystal layers have different refractive index differences Δn, by adjusting different liquid layers, the brightness of the corresponding color light may be adjusted.

By adjusting the thickness of the liquid crystal layer, the refractive index difference Δn of the liquid crystal layer, and the driving voltage of the liquid crystal layer, a° of chromatic aberration between the images in the front and side viewing angles under the anti-peep mode may be better improved.

Optionally, the thickness of the first liquid crystal layer 22 is greater than the thickness of the second liquid crystal layer 32, and the refractive index difference Δn of the first liquid crystal layer 22 is less than the refractive index difference Δn of the second liquid crystal layer 32.

Alternatively, the thickness of the first liquid crystal layer 22 is less than the thickness of the second liquid crystal layer 32, and the refractive index difference Δn of the first liquid crystal layer 22 is greater than the refractive index difference Δn of the second liquid crystal layer 32.

A larger refractive index difference Δn matches a smaller thickness of the liquid crystal layer, which not only maintains a high light transmittance, but also may better reduce the cell thickness to make the display device 100 thinner. A smaller refractive index difference Δn matches a larger thickness of the liquid crystal layer, which not only maintains high light transmittance but also reduces costs. The first dimming box 20 and the second dimming box 30 adopt a method in which different refractive index differences Δn match different thicknesses of the liquid crystal layers, which may adjust different light wavelength bands in a wider range and may more flexibly improve the chromatic aberration between images at the front viewing angle and the side viewing angle under the anti-peep mode.

Optionally, the thickness of the first liquid crystal layer 22 and the thickness of the second liquid crystal layer 32 are between 2 microns and 10 microns, and the refractive index difference Δn of the first liquid crystal layer 22 and the refractive index of the second liquid crystal layer 32 are between 0.1 and 0.26.

For example, the thickness of the first liquid crystal layer 22 and the thickness of the second liquid crystal layer 32 may each be 2 microns, 3 microns, 4 microns, 5 microns, 6 microns, 7 microns, 8 microns, 9 microns, or 10 microns, etc.

Optionally, the refractive index difference Δn of the first liquid crystal layer 22 and the refractive index difference Δn of the second liquid crystal layer 32 may each be between 0.1, 0.11, 0.12, 0.13, 0.14, 0.15, 0.16, 0.17, 0.18, 0.19, 0.2, 0.21, 0.22, 0.23, 0.24, 0.25, or 0.26, etc.

The first driving voltage and the second driving voltage may be further adjusted according to actual situations to improve the chromatic aberration between images at the front viewing angle and the side viewing angle under the anti-peep mode.

Optionally, in some embodiments, the thickness of the first liquid crystal layer 22 and the thickness of the second liquid crystal layer 32 may be different, and the refractive index difference Δn of the first liquid crystal layer 22 and the refractive index difference Δn of the second liquid crystal layer 32 may be different, and the first driving voltage supplied to the first dimming box 20 may be the same as the second driving voltage supplied to the second dimming box 30.

Figure 10:
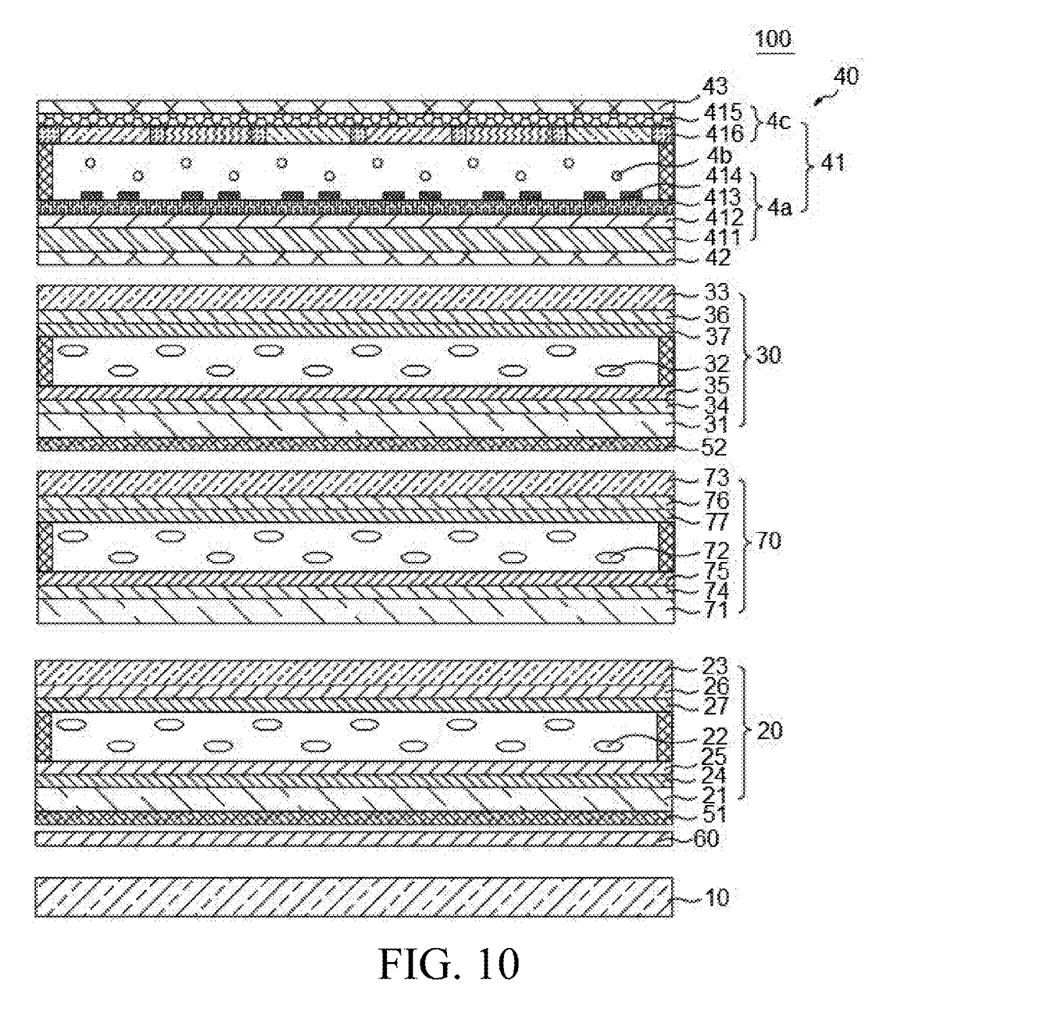
FIG. 10 is another schematic structural view of a display device provided by an embodiment of the present disclosure.

Optionally, referring to FIG. 10, in some embodiments, the display device 100 may also include a third dimming box 70. The third dimming box 70 is disposed between the first dimming box 20 and the liquid crystal display module 40. The color coordinate offset between the color coordinates corresponding to the side viewing angle of 45° under the anti-peep mode and the color coordinates corresponding to the front viewing angle under the anti-peep mode is less than 0.1869.

In the light emitted by the first dimming box 20, on a condition that the proportion of light intensity of the blue light has the largest offset, followed by the proportion of light intensity of the red light, and the proportion of light intensity of the green light has the smallest offset, the second dimming box 30 is configured to reduce the proportion of light intensity of the blue light, and the third dimming box 70 is configured to reduce the proportion of light intensity of of the red light. In the light emitted by the first dimming box 20, on a condition that on the proportion of light intensity of the red light has the largest offset, followed by the proportion of light intensity of the blue light, and the proportion of light intensity of the green light has the smallest, the second dimming box 30 is configured to reduce the proportion of light intensity of the red light, and the third dimming box 70 is configured to reduce the proportion of light intensity of of the blue light.

That is to say, in the embodiments of the present disclosure, multiple dimming boxes are stacked and used, and the thicknesses and driving voltages of the second dimming box 30 and the third dimming box 70 are adjusted according to characteristics of light emitted by the first dimming box 20, so that while ensuring that the emitted light has a narrow viewing angle, it may better improve the serious imbalance in the proportions of light intensity of red light, green light, and blue light, making the color coordinate corresponding to the viewing angle of 45° under the anti-peep mode closer to the color coordinate corresponding to the viewing angle of 0° under the anti-peep mode, reducing the chromatic aberration between images at the side viewing angle and the front viewing angle, and further optimizing the anti-peep effect of the side view display image under the anti-peep mode.

Optionally, the third dimming box 70 and the first dimming box 20 have the same mode architecture, such as the ECB mode architecture or the VA mode architecture.

Optionally, the third dimming box 70 includes a fifth substrate 71, a third liquid crystal layer 72, and a sixth substrate 73 which are stacked in sequence. The fifth substrate 71 is disposed on one side close to the backlight module 10. The third dimming box 70 further includes a fifth driving electrode 74, a fifth alignment film 75, a sixth driving electrode 76, and a sixth alignment film 77. The fifth driving electrode 74 is disposed on one side of the fifth substrate 71 close to the third liquid crystal layer 72. The fifth alignment film 75 is disposed on one side of the fifth driving electrode 74 close to the third liquid crystal layer 72. The sixth driving electrode 76 is disposed on one side of the sixth substrate 73 close to the third liquid crystal layer 72. The sixth alignment film 77 is disposed on one side of the sixth driving electrode 76 close to the third liquid crystal layer 72.

Optionally, the refractive index difference Δn of the first liquid crystal layer 22, the refractive index difference Δn of the second liquid crystal layer 32, and a refractive index difference Δn of the third liquid crystal layer 72 of the third dimming box 70 are different.

The thickness of the first liquid crystal layer 22, the thickness of the second liquid crystal layer 32, and a thickness of the third liquid crystal layer 72 of the third dimming box 70 are different.

The first driving voltage supplied to the first dimming box 20, the second driving voltage supplied to the second dimming box 30, and a third driving voltage supplied to the third dimming box 70 are different.

Of course, in some implementations, two of the first dimming box 20, the second dimming box 30, and the third dimming box 70 may have the same thickness of the liquid crystal layer and the same the refractive index difference Δn of the liquid crystal layer, or two of the first dimming box 20, the second dimming box 30, and the third dimming box 70 may have the same driving voltage.

It can be understood that the display device 100 may further include more dimming boxes to better improve the serious imbalance in the proportions of light intensity of red light, green light, and blue light, reducing the chromatic aberration between images at the side viewing angle and the front viewing angle.

Embodiments of the present disclosure provide the display device having the anti-peep mode in a narrow viewing angle and the sharing mode in a wide viewing angle, and the display device includes the backlight module, the first dimming box, the second dimming box, and the liquid crystal display module. The first dimming box is arranged on the light-emitting side of the backlight module. The second dimming box is arranged on the light-emitting side of the first dimming box. The liquid crystal display module is arranged on the light-emitting side of the second dimming box. At the side viewing angle under the anti-peep mode, the second dimming box is configured to weak the color light having the highest brightness emitted by the first dimming box. At the side viewing angle under the anti-peep mode, the embodiments of the present disclosure weak the color light having the highest brightness emitted by the first dimming box by controlling the second dimming box, reducing the difference in the proportions of red light, green light, and blue light, thereby improving the chromatic aberration between images at the side viewing angle and the front viewing angle under the anti-peep mode of the display device.

The display device provided by the embodiments of the present disclosure has been introduced in detail above. Specific examples are used in this paper to illustrate the principles and implementation methods of the present disclosure. The description of the above embodiments is only used to help understand the methods and core ideas of the present disclosure. At the same time, for those skilled in the art, there will be changes in the specific implementation and application scope based on the ideas of the present disclosure. In summary, the content of this description should not be understood as a limitation of the present disclosure.

The invention claimed is:

1. A display device, having an anti-peep mode in a narrow viewing angle and a sharing mode in a wide viewing angle, and the display device comprising:
a backlight module;
a first dimming box, disposed on a light-emitting side of the backlight module;
a second dimming box, disposed on a light-emitting side of the first dimming box; and
a liquid crystal display module, disposed on a light-emitting side of the second dimming box,
wherein a color coordinate offset between a color coordinate corresponding to a side viewing angle of 45° under the anti-peep mode and a color coordinate corresponding to a front viewing angle under the anti-peep mode is less than 0.1869.

2. The display device according to claim 1, wherein the first dimming box comprises a first substrate, a first liquid crystal layer, and a second substrate which are stacked in sequence, and the first substrate is disposed on one side close to the backlight module; the second dimming box comprises a third substrate, a second liquid crystal layer, and a fourth substrate which are stacked in sequence, and the third substrate is disposed on one side close to the first dimming box; and
a thickness of the first liquid crystal layer is equal to a thickness of the second liquid crystal layer, a refractive index difference of the first liquid crystal layer is the same with a refractive index difference of the second liquid crystal layer, and a first driving voltage supplied to the first dimming box is different from a second driving voltage supplied to the second dimming box.

3. The display device according to claim 2, wherein the first driving voltage and the second driving voltage are alternating voltages, an amplitude of the first driving voltage is between 3.5V and 5.5V, and an amplitude of the second driving voltage is between 4V and 7V.

4. The display device according to claim 3, wherein the thickness of the first liquid crystal layer and the thickness of the second liquid crystal layer are between 4 microns and 8 microns.

5. The display device according to claim 3, wherein each of a frequency of the first driving voltage and a frequency of the second driving voltage is between 40 Hz and 120 Hz.

6. The display device according to claim 1, wherein the first dimming box comprises a first substrate, a first liquid crystal layer, and a second substrate which are stacked in sequence, and the first substrate is disposed on one side close to the backlight module; the second dimming box comprises a third substrate, a second liquid crystal layer, and a fourth substrate which are stacked in sequence, and the third substrate is disposed on one side close to the first dimming box; and
a thickness of the first liquid crystal layer is different from a thickness of the second liquid crystal layer, and a refractive index difference of the first liquid crystal layer is different from a refractive index difference of the second liquid crystal layer.

7. The display device according to claim 6, wherein a first driving voltage supplied to the first dimming box is different from a second driving voltage supplied to the second dimming box.

8. The display device according to claim 7, wherein the thickness of the first liquid crystal layer is greater than the thickness of the second liquid crystal layer, and the refractive index difference of the first liquid crystal layer is less than the refractive index difference of the second liquid crystal layer.

9. The display device according to claim 7, wherein the thickness of the first liquid crystal layer is less than the thickness of the second liquid crystal layer, and the refractive index difference of the first liquid crystal layer is greater than the refractive index difference of the second liquid crystal layer.

10. The display device according to claim 8, wherein each of the thickness of the first liquid crystal layer and the thickness of the second liquid crystal layer is between 2 microns and 10 microns, and each of the refractive index difference of the first liquid crystal layer and the refractive index difference of the second liquid crystal layer is between 0.1 and 0.26.

11. The display device according to claim 2, wherein an amplitude of the first driving voltage is an optimal driving voltage amplitude, and an amplitude of the second driving voltage is a non-optimal driving voltage amplitude.

12. The display device according to claim 2, wherein an amplitude of the first driving voltage is a non-optimal driving voltage amplitude, and an amplitude of the second driving voltage is a non-optimal driving voltage amplitude.

13. The display device according to claim 1, wherein the display device further comprises a first polarizer, a second polarizer, and an anti-peeping film; the liquid crystal display module comprises a liquid crystal panel, a third polarizer, and a fourth polarizer, the fourth polarizer is disposed on one side of the liquid crystal panel facing away from the backlight module, and the third polarizer is disposed on one side of the liquid crystal panel close to the backlight module; the second polarizer is disposed between the first dimming box and the second dimming box, and the first polarizer is disposed on one side of the first dimming box close to the backlight module;

the anti-peeping film is disposed between any two of the backlight module, the first polarizer, the first dimming box, the second polarizer, the second dimming box, the third polarizer, the liquid crystal panel, and the fourth polarizer; and the anti-peeping film is arranged to have a reflectivity positively correlated with an incident angle of light.

14. The display device according to claim 13, wherein the anti-peeping film comprises light-transmitting films stacked in multiple layers, and any two adjacent layers of the light-transmitting films have different refractive indexes.

15. The display device according to claim 1, wherein the display device further comprises a third dimming box disposed between the first dimming box and the liquid crystal display module.

16. The display device according to claim 15, wherein the third dimming box comprises a fifth substrate, a third liquid crystal layer, and a sixth substrate which are stacked in sequence, and the fifth substrate is disposed on one side close to the backlight module; the third dimming box further comprises a fifth driving electrode, a fifth alignment film, a sixth driving electrode, and a sixth alignment film, the fifth driving electrode is disposed on one side of the fifth substrate close to the third liquid crystal layer, the fifth alignment film is disposed on one side of the fifth driving electrode close to the third liquid crystal layer, the sixth driving electrode is disposed on one side of the sixth substrate close to the third liquid crystal layer, and the sixth alignment film is disposed on one side of the sixth driving electrode close to the third liquid crystal layer.

17. The display device according to claim 16, wherein a refractive index difference of the first liquid crystal layer, a refractive index difference of the second liquid crystal layer, and a refractive index difference of the third liquid crystal layer are different.

18. The display device according to claim 17, wherein a thickness of the first liquid crystal layer, a thickness of the second liquid crystal layer, and a thickness of the third liquid crystal layer are different.

19. The display device according to claim 18, wherein a first driving voltage supplied to the first dimming box, a second driving voltage supplied to the second dimming box, and a third driving voltage supplied to the third dimming box are different.

20. The display device according to claim 16, wherein a refractive index difference of the first liquid crystal layer, a refractive index difference of the second liquid crystal layer, and a refractive index difference of the third liquid crystal layer are the same; and a thickness of the first liquid crystal layer, a thickness of the second liquid crystal layer, and a thickness of the third liquid crystal layer are the same.

\* \* \* \* \*